(12) United States Patent
Chari et al.

(10) Patent No.: US 8,983,877 B2
(45) Date of Patent: Mar. 17, 2015

(54) ROLE MINING WITH USER ATTRIBUTION USING GENERATIVE MODELS

(75) Inventors: Suresh N. Chari, Scarsdale, NY (US); Ian Michael Molloy, White Plains, NY (US); Youngja Park, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 13/411,174

(22) Filed: Mar. 2, 2012

(65) Prior Publication Data

US 2012/0246098 A1     Sep. 27, 2012

Related U.S. Application Data

(60) Provisional application No. 61/454,848, filed on Mar. 21, 2011.

(51) Int. Cl.
  *G06N 5/00*      (2006.01)
  *G06F 1/00*      (2006.01)
  *G06N 99/00*     (2010.01)
  *G06F 21/60*     (2013.01)

(52) U.S. Cl.
  CPC ............ *G06N 99/005* (2013.01); *G06F 21/604* (2013.01)
  USPC .............................. 706/12; 707/738; 717/122

(58) Field of Classification Search
  CPC ........... G06F 15/18; G06F 17/03; G06N 5/02; G06N 3/08
  See application file for complete search history.

(56) References Cited

U.S. PATENT DOCUMENTS

2008/0083025 A1* 4/2008 Meijer et al. ...................... 726/9
2008/0244418 A1* 10/2008 Manolescu et al. ........... 715/753
2011/0106743 A1* 5/2011 Duchon ........................ 706/46

OTHER PUBLICATIONS

M. Frank et al., "A class of probabilistic models for role engineering," Proceedings of the 15th ACM conference on Computer and communications security, pp. 299-310 (2008).
C. Kemp et al., "Learning systems of concepts with an infinite relational model," AAAI'06 Proceedings of the 21st national conference on Artificial intelligence—vol. 1 (2006), all pages.
I. Molloy et al., "Mining roles with noisy data," SACMAT Proceedings of the 15th ACM symposium on Access control models and technologies, pp. 45-54 (2010).
A.P. Streich et al., "Multi-assignment clustering for Boolean data," Proceedings of the 26th Annual International Conference on Machine Learning, pp. 969-976 (2009).

(Continued)

*Primary Examiner* — Jeffrey A Gaffin
*Assistant Examiner* — Kalpana Bharadwaj
(74) *Attorney, Agent, or Firm* — Anne V. Dougherty; Michael J. Chang, LLC

(57) ABSTRACT

Applications of machine learning techniques such as Latent Dirichlet Allocation (LDA) and author-topic models (ATM) to the problems of mining of user roles to specify access control policies from entitlement as well as logs which contain record of the usage of these entitlements are provided. In one aspect, a method for performing role mining given a plurality of users and a plurality of permissions is provided. The method includes the following steps. At least one generative machine learning technique, e.g., LDA, is used to obtain a probability distribution θ for user-to-role assignments and a probability distribution β for role-to-permission assignments. The probability distribution θ for user-to-role assignments and the probability distribution β for role-to-permission assignments are used to produce a final set of roles, including user-to-role assignments and role-to-permission assignments.

21 Claims, 12 Drawing Sheets

(56) References Cited

OTHER PUBLICATIONS

Frank et al., "A probabilistic approach to hybrid role mining," CCS'09: Proceedings of the 16th ACM conference on Computer and communications security (Nov. 2009), all pages.

A.P. Singh et al., "Relational learning via collective matrix factorization," KDD'08, pp. 650-658 (2008).

Schlegelmilch and Steffens, "Role Mining with ORCA," SACMAT '05: Proceedings of the tenth ACM symposium on Access control models and technologies, 2005 pp. 168-176.

Vaidya et al., "RoleMiner: Mining Roles using Subset Enumeration," CCS '06: Proceedings of the 13th ACM conference on Computer and communications security, 2006, all pages.

Vaidya et al., "The Role Mining Problem: Finding a Minimal Descriptive Set of Roles," SACMAT '07: Proceedings of the 12th ACM symposium on Access control models and technologies, 2007, all pages.

Lu et al., "Optimal Boolean Matrix Decomposition: Application to Role Engineering," IEEE Symposium on Security and Privacy 2008 pp. 297-306.

Zhang et al., "Role Engineering using Graph Optimisation," SACMAT '07: Proceedings of the 12th ACM symposium on Access control models and technologies 2007 pp. 139-144.

Molloy et al., "Mining Roles with Semantic Meanings," SACMAT '08: Proceedings of the 13th ACM symposium on Access control models and technologies, 2008 pp. 21-30.

E.J. Coyne "Role engineering," RBAC'95 Proceedings of the first ACM Workshop in Role-based access control, p. I-15-I-16 (1995).

M. Frank et al., "On the definition of role mining," SACMAT'10 Proceedings of the 15th ACM symposium on Access control models and technologies, pp. 35-44 (Jun. 2010).

D. Blei et al., "Latent dirichlet allocation," Journal of Machine Learning Research, 3; 993-1022 (2003).

M. Rosen-Zvi et al., "The author-topic model for authors and documents," in Proceedings of the 20th Annual Conference on Uncertainty in Artificial Intelligence (UAI 2004) (2004).

M. Rosen-Zvi et al., "Learning author-topic models from text corpora," ACM Transactions on Information Systems 28(1) (2008), all pages.

Molloy et al., "Mining Roles with Semantic Meanings," SACMAT 08, Jun. 11-13, 2008, pp. 21-30.

A. Ene et al., "Fast Exact and Heuristic Methods for Role Minimization Problems," 13th ACM Symposium on Access Control Models and Technologies (SACMAT 2008) pp. 1-10, Jun. 11-13, 2008.

H.W. Kuhn, "The Hungarian Method for the Assignment Problem," Naval Research Logistics Quarterly, 2(83-97) (1995).

\* cited by examiner

FIG. 3

| DATASET | ROLES | MAC | LDA |
|---|---|---|---|
| FIREWALL 1 | 25 | 28.6h | 88s |
| APJ | 25 | 122.5h | 529s |
| CUSTOMER 1 | 15 | 3.4h | 37s |

FIG. 4

| DATASET | ROLES | MAC | | LDA | |
|---|---|---|---|---|---|
| | | UNDER | OVER | UNDER | OVER |
| FIREWALL 1 | 25 | 413 | 102 | 540 | 202 |
| CUSTOMER 1 | 15 | 2572 | 1041 | 2298 | 594 |

| ITERATIONS | ROLES | HAMMING | OVER | UNDER |
|---|---|---|---|---|
| 1 | 25 | 5203 | 521 | 4682 |
| 2 | 50 | 4916 | 587 | 4329 |
| 3 | 75 | 3867 | 702 | 3165 |
| 4 | 100 | 3710 | 718 | 2992 |
| 5 | 125 | 3633 | 745 | 2888 |
| 6 | 150 | 3613 | 753 | 2860 |

FIG. 7

| ITERATIONS | ROLES | HAMMING | OVER | UNDER |
|---|---|---|---|---|
| 1 | 15 | 5032 | 546 | 4486 |
| 2 | 30 | 4727 | 603 | 4124 |
| 3 | 45 | 4328 | 642 | 3686 |
| 4 | 60 | 4132 | 679 | 3453 |
| 5 | 75 | 4123 | 679 | 3444 |
| 6 | 90 | 3990 | 701 | 3289 |
| 7 | 105 | 3928 | 720 | 3208 |
| 8 | 120 | 3890 | 723 | 3167 |
| 9 | 135 | 3878 | 723 | 3155 |
| 10 | 150 | 3843 | 737 | 3106 |

| DATASET | UP | $R \subseteq U$ | | INF. AND FIT | | INF. MAX DROP | |
|---|---|---|---|---|---|---|---|
| | | UNDER | OVER | UNDER | OVER | UNDER | OVER |
| FIREWALL | 3414.7 | 2.7 | 1691.8 | 0 | 658 | 101.9 | 1685.9 |
| CUSTOMER 1 | 714.3 | 30.5 | 266.6 | 0 | 446.7 | 137 | 250 |

ROLE MINING WITH USER ATTRIBUTION USING GENERATIVE MODELS

CROSS REFERENCE TO RELATED APPLICATIONS

This application claims the benefit of U.S. Provisional Application No. 61/454,848, filed Mar. 21, 2011, the contents of which are incorporated by reference herein.

FIELD OF THE INVENTION

The present invention relates to role based access control models, and more particularly to, generative models, i.e., models that can explain observations of usage of access control permissions and are causally tied to user attributes, and to the use of such models to the problem of prediction of permission assignment and provisioning.

BACKGROUND OF THE INVENTION

Role-based access control is a popular model for access control policy and is used widely in practice as it provides a convenient way to specify entitlements corresponding to specific business function. An active area of research has been to identify efficient methodologies to take a corpus of users and the entitlements assigned to them and decompose this into a set of role assignments to users and permissions assigned to roles. Almost all prior work on role based access control focuses on building such decompositions from static set of entitlements and rarely consider usage of entitlements.

In related works, most probabilistic models for provisioning entitlements, including the very few which leverage attributes, are from role mining literature. The disjoint decomposition model (DDM) assigns each user to a single business role, and each permission to a single functional role. The disjoint decomposition model is described, for example, in M. Frank et al., "A class of probabilistic models for role engineering," Proceedings of the 15$^{th}$ ACM conference on Computer and communications security, pgs. 299-310 (2008) (hereinafter "Frank 2008"), the contents of which are incorporated by reference herein. The infinite relational model is described, for example, in C. Kemp et al., "Learning systems of concepts with an infinite relational model," AAAI '06 Proceedings of the 21$^{st}$ national conference on Artificial intelligence-Volume 1 (2006) (hereinafter "Kemp"), the contents of which are incorporated by reference herein. A two-layer role hierarchy connects business roles to technical roles, authorizing permissions to users. The users and permissions are co-clustered attempting to maximize the likelihood of observed data. Constraining each user to a single business role necessitates the creation of a large number of roles, which the infinite relational model penalizes and often results in significant permission under-assignment, including revocation of all permissions from some users. See, for example, I. Molloy et al., "Mining roles with noisy data," SACMAT Proceedings of the 15$^{th}$ ACM symposium on Access control models and technologies," pgs. 45-54 (2010) (hereinafter "Molloy"), the contents of which are incorporated by reference herein.

The state of the art is Multi-Assignment Clustering (MAC) which probabilistically tries to find a good assignment of roles to permissions across all possible assignments of at most t roles to any single user. See, for example, A. P. Streich et al., "Multi-assignment clustering for Boolean data," Proceedings of the 26$^{th}$ Annual International Conference on Machine Learning, pgs. 969-976 (2009) (hereinafter "Streich"), the contents of which are incorporated by reference herein. Thus, only small values of t are feasible as the running time is exponential in t. MAC assumes that each assignment (u,p) comes from either a signal or a noise distribution, and the signal allows each user to obtain a permission from multiple clusters it is assigned. A cost function for assigning a user to a particular cluster is based on the probability that the user obtains the given permission from either the signal or noise distributions. To calculate the fitness of the data, called the risk, requires model evaluation for all cluster sets, which is exponential and must be constrained. The MAC technique has since been extended to include user attributes where the risk measure is weighted with a role's attribute compliance and the number of attributes shared by users assigned the role. See, for example, Frank et al., "A probabilistic approach to hybrid role mining," CCS '09: Proceedings of the 16$^{th}$ ACM conference on Computer and communications security (November 2009) (hereinafter "Frank 2009"), the contents of which are incorporated by reference herein. However, the MAC method only works for a single attribute type, such as the user's title or job code.

Finally, Molloy uses collective matrix factorization to clean and preprocess the user-permission (UP) and user-attribute (UA) relations prior to role mining. Collective matrix factorization is described, for example, in A. P. Singh et al., "Relational learning via collective matrix factorization," KDD '08, pgs. 650-658 (2008) (hereinafter "Singh"), the contents of which are incorporated by reference herein. Collective matrix factorization will produce a decomposition that shares a factor over the common dimension, i.e., $UA \approx A \times B^T$, $UP \approx B \times C^T$, minimizing a linear sum of their losses, $a*D(UA \| A \times B^T) + (1-a)D(UP \| B \times C^T)$. The resulting factors are not boolean, and cannot be directly interpreted as roles.

The ORCA method performs hierarchical clustering on permissions, merging sets of permissions with the largest intersection of users authorized to the union of all permissions (see Schlegelmilch and Steffens, "Role Mining with ORCA," SACMAT '05: Proceedings of the tenth ACM symposium on Access control models and technologies, 2005 pp. 168-176).

A common technique for role mining defines a candidate role as the intersection of the permissions assigned to two or more users (see Vaidya et al., "RoleMiner: Mining Roles using Subset Enumeration," CCS '06: Proceedings of the 13th ACM conference on Computer and communications security, 2006). This technique produces a large set of candidate roles, from which a small number are selected that optimize some criteria, such as the number of roles (see Vaidya et al., "The Role Mining Problem: Finding a Minimal Descriptive Set of Roles," SACMAT '07: Proceedings of the 12th ACM symposium on Access control models and technologies, 2007), or the number of user- and permission-assignments (Lu et al., "Optimal Boolean Matrix Decomposition: Application to Role Engineering," IEEE Symposium on Security and Privacy 2008 pp. 297-306). These optimizations are exponential to solve and greedy heuristics are used instead.

In graph optimization, an initial set of roles is defined, such as one role per user, and through a series of optimizations, such as merging roles or adding role hierarchy edges, a cost measure is reduced (see Zhang et al., "Role Engineering using Graph Optimisation," SACMAT '07: Proceedings of the 12th ACM symposium on Access control models and technologies 2007 pp. 139-144). Ene et al., "Fast Exact and Heuristic Methods for Role Minimization Problems," SACMAT '08: Proceedings of the 13th ACM symposium on Access control models and technologies 2008 pp. 1-10 generate roles as bicliques of users and permissions and perform a biclique cover. A similar approach models the role mining process using formal concept analysis (a formal concept is a maximal biclique) and identifies roles via pruning the formal concept lattice (see Molloy et al., "Mining Roles with Semantic Meanings," SACMAT '08: Proceedings of the 13th ACM symposium on Access control models and technologies, 2008 pp. 21-30). None of these techniques are probabilistic, and all attempt to produce an role-based access control (RBAC) state that models the exact same level of access as the input data. Noise or errors in the input data has been found to cause performance problems for these approaches (see Molloy).

Thus, improved role decomposition techniques that operate more efficiently and can accommodate multiple roles for multiple users would be desirable.

SUMMARY OF THE INVENTION

The present invention provides applications of machine learning techniques such as Latent Dirichlet Allocation (LDA) and author-topic models (ATM) to the problems of mining of user roles to specify access control policies from entitlement as well as logs which contain record of the usage of these entitlements. In one aspect of the invention, a method for performing role mining given a plurality of users and a plurality of permissions is provided. The method includes the following steps. At least one generative machine learning technique, e.g., LDA, is used to obtain a collection K of k roles, a probability distribution $\theta$ for user-to-role assignments and a probability distribution $\beta$ for role-to-permission assignments. The probability distribution $\theta$ for user-to-role assignments and the probability distribution $\beta$ for role-to-permission assignments are used to produce a final set of roles, including user-to-role assignments and role-to-permission assignments.

In another aspect of the invention, a method for mining user roles from usage log data which describes the use of permissions is provided. This method extends the method for mining roles from permissions by weighting each permission with the frequency with which each user uses this permission.

In yet another aspect of the invention a method is provided where the roles mined from permissions or usage log data is causally correlated with attributes of the user such as work location, department, whether he/she is a manager etc. An attribute is a key-value pair from a finite set of keys to a finite set of values, for example, strings to strings or strings to integers. The method includes the following steps. At least one machine learning technique, such as author-topic models (ATM), is used to obtain a collection K of k roles, a probability distribution $\theta$ for user-to-role assignments and a probability distribution $\beta$ for role-to-permission assignments using a set of user attributes for each user. The probability distribution $\theta$ for user-to-role assignments and the probability distribution $\beta$ are used for role-to-permission assignments to produce a final set of roles, including user-to-role assignments and role-to-permission assignments. In this method, similar users (i.e., users with similar attributes) are assigned the same roles. This is a very natural way of performing and reasoning with role decompositions and leads to access control policies which are easy to administer.

In still yet another aspect of the invention, a method for prediction of user roles and entitlements to be assigned to the user based on the user's attributes is provided. This method utilizes the method for mining roles using user attributes which are causally correlated to the user. Given the attributes of a new user, the roles that are causally derived from these attributes and the corresponding permissions are assigned to the user. This method results in a probability distribution of the roles to be assigned to the new user which is then discretized by another process.

The present invention improves on the state of the art in a number of ways. First the decompositions allow us to allocate any arbitrary number of roles to users thus removing the artificial constraints that prior art places on this problem. Second the methodology operates significantly more efficiently than conventional techniques. Most importantly the role decompositions that the present techniques provide can be based on both the basic permissions and the usage of the permissions as well. The present role decomposition method can causally associate the role assignments to business and other attributes of the user, such as department, location, whether he or she is a manager etc. Such assignments which are associated strongly with user attributes can be used for predictive modeling of permission assignment, i.e., a new user's attributes can be used to predict the permissions to be assigned to the new user.

In another aspect of the invention, a method for predictive modeling of roles and permissions for a new user is provided. The method includes the following steps. At least one machine learning technique is used to obtain a collection K of k roles, a probability distribution $\theta$ for user-to-role assignments and a probability distribution $\beta$ for role-to-permission assignments. The probability distribution $\theta$ for user-to-role assignments and the probability distribution $\beta$ are used for role-to-permission assignments to produce a final set of roles, including user-to-role assignments and role-to-permission assignments. Attributes of a new user are analyzed. A probability distribution of roles for the new user is identified based on the final set of roles.

A more complete understanding of the present invention, as well as further features and advantages of the present invention, will be obtained by reference to the following detailed description and drawings.

BRIEF DESCRIPTION OF THE DRAWINGS

FIG. 3 is a table illustrating a performance, e.g., running time, comparison with multi-assignment clustering (MAC) over a range of data sets according to an embodiment of the present invention;

FIG. 4 is a table illustrating a performance, e.g., coverage data, comparison with MAC over a range of data sets according to an embodiment of the present invention;

FIG. 7 is another diagram illustrating the results of iteratively running the present LDA miner resulting in the same number of roles on the Customer 1 dataset with differing numbers of roles and iterations according to an embodiment of the present invention;

DETAILED DESCRIPTION OF PREFERRED EMBODIMENTS

Figure 1:
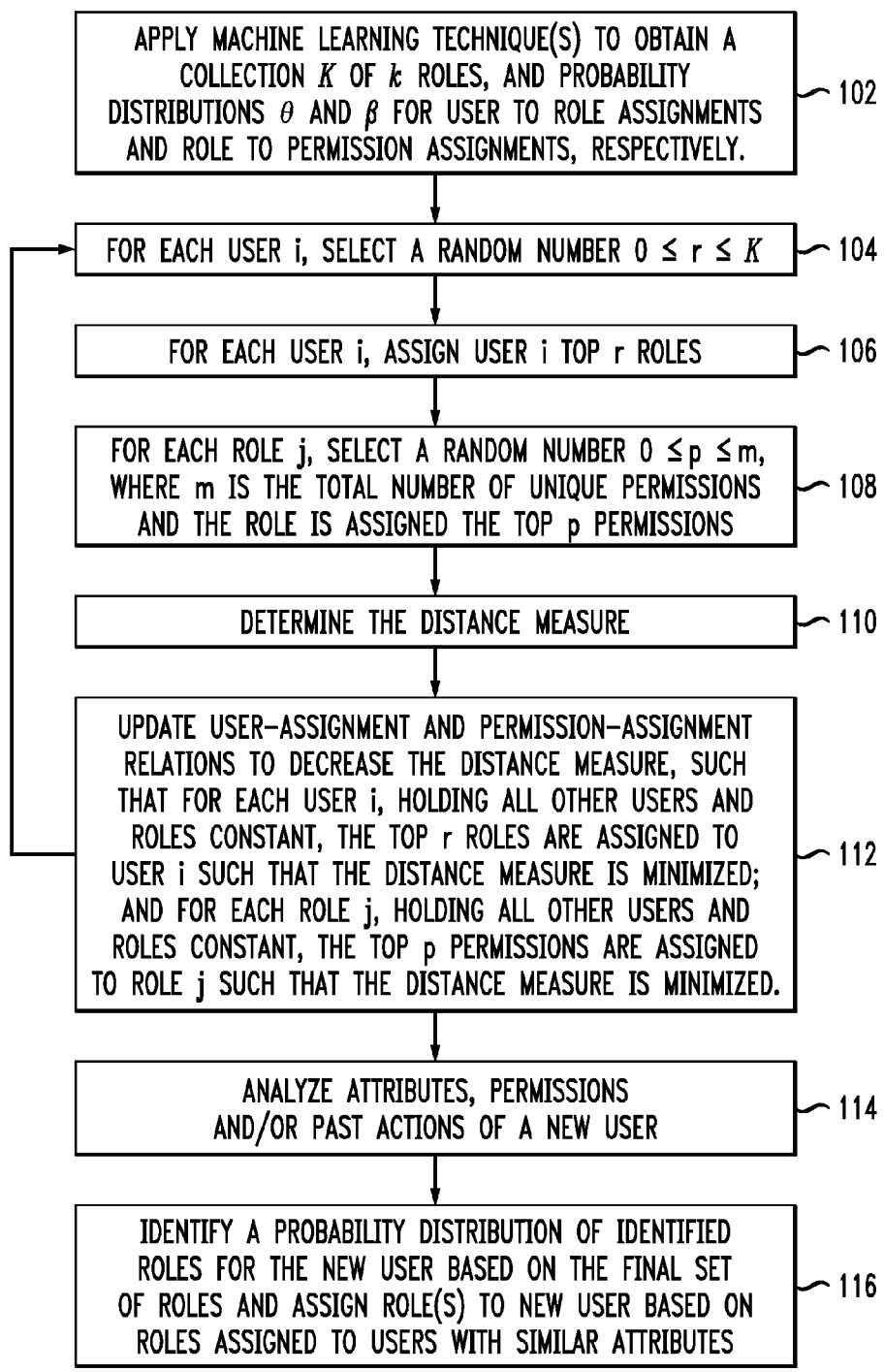
FIG. 1 is a diagram illustrating an exemplary method to obtain role permission assignments according to an embodiment of the present invention.

Given the shortcomings of the above-described conventional role mining processes, a role decomposition technique that can associate role assignments with the actions, such as which entitlement are used, and attributes, such as the department and job roles of users, would be desirable. The role mining problem is now described. Role-based access control (RBAC) is an attractive and widely used model in enterprise security and identity management products. RBAC offers a conceptually simple way to tie entitlements to business function, reduces the number of relations to be managed and makes administration simpler. The process of role engineering, which is the step of constructing the RBAC systems, is the most costly part of adopting a role-based system. See, for example, E. J. Coyne "Role engineering," RBAC '95 Proceedings of the first ACM Workshop in Role-based access control, pg. I-15-I-16 (1995) (hereinafter "Coyne"), the contents of which are incorporated by reference herein.

One approach to role engineering is the top-down approach where security professionals, managers, and others perform analysis of business processes and derive roles based on this analysis. The top-down process is labor intensive, costly, and potentially error prone. An alternative is role mining, the bottom-up approach of employing data mining techniques on existing entitlement data to derive roles. The role mining literature has many alternatives to the following definition to account for different inputs and constraints on output state.

Definition 1. An access control configuration is a tuple $p=(U,P,UP,UA)$, where U is a set of users, P is a set of permissions, UP is the user-permission relation $UP \subseteq U \times P$, and UA is a user-attribute relation, typically a key-value pair, $UA: U \times A \rightarrow V$. The output is an RBAC state, $\lambda=(R,UR,RP,RH)$, where R is a set of roles, UR is a user-role assignment relation, $UR \subseteq U \times R$, RP is the role-permission relation, $RP \subseteq R \times P$, and RH is a role hierarchy, $RH \subseteq R \times H$.

To complete this definition, one needs a set of constraints or optimization objectives. There are many optimizations used in the literature, such as reducing the number of roles or linear combination of the number of assignments such that p and $\lambda$ represent the same level of access. See, for example, Molloy and M. Frank et al., "On the definition of role mining," SACMAT '10 Proceedings of the 15$^{th}$ ACM symposium on Access control models and technologies, pgs. 35-44 (June 2010) (hereinafter "Frank 2010"), the contents of which are incorporated by reference herein. In practice, real data is noisy and contains errors or incorrect assignments, and many entitlements are exceptions and should not be provisioned via roles. See, for example, Molloy.

A new approach to role mining is provided herein that focuses on modeling how users are provisioned with entitlements and, in particular, how exactly they use these entitlements. In one embodiment, this role decomposition is causally associated with attributes of the user, which is the most natural way to provision entitlements. At the core of the present techniques, generative models from machine learning such as Latent Dirichlet Allocation (LDA) and Author-Topic models (ATM) are used to learn probability distributions of users over roles and then specific discretization procedures are provided which convert these probabilistic assignments to discrete roles.

Generative models in machine learning as used in the present techniques are now described. To find natural role decompositions which can be explained by user attributes, techniques in machine learning are adapted herein to find the latent roles in a given set of user permissions. These models intuitively describe how the observations were generated given some hidden parameters, and are effective for estimating soft (probabilistic) associations between hidden parameters and observations, and for extracting latent structure in a given data. The problem of finding latent roles in a set of permissions is translated to the problem of latent semantic analysis, i.e., finding the latent topics in a collection of documents.

The approach presented herein is based on the machine learning techniques of Latent Dirichlet Allocation (LDA) and author-topic models (ATM). Latent Dirichlet Allocation is described, for example, in D. Blei et al., "Latent dirichlet allocation," *Journal of Machine Learning Research*, 3; 993-1022 (2003) (hereinafter "Blei"), the contents of which are incorporated by reference herein. Author-topic models are described, for example, in M. Rosen-Zvi et al., "The author-topic model for authors and documents," in *Proceedings of the 20$^{th}$ Annual Conference on Uncertainty in Artificial Intelligence* (UAI 2004) (2004) (hereinafter "Rosen-Zvi 2004") and in M. Rosen-Zvi et al., "Learning author-topic models from text corpora," ACM Transactions on Information Systems 28(1) (2008) (hereinafter "Rosen-Zvi 2008"), the contents of each of which are incorporated by reference herein. Latent Dirichlet Allocation (LDA) and author-topic models (ATM) are widely used in text analytics as generative models of a given corpus of documents, which in this case are the permissions assigned to each user. These methods aim to find a good set of topics (a probabilistic distribution over words) which explain this corpus. The main contribution of the present techniques is to adapt the role decomposition problem to use these LDA and ATM machine learning methods and extend them to obtain discrete roles from probability ensembles. These techniques are well suited for role mining applications since they require no manual labels and allow users to have multiple roles while still resulting in decompositions which can be easily understood and managed.

Latent Dirichlet Allocation (LDA) is a probabilistic generative model for collections of discrete data such as text collections. See, for example, Blei. Each document in a corpus (i.e., a collection of writings) is modeled as a finite mixture over an underlying set of topics, and each topic is, in turn, modeled as a distribution over words. LDA assumes the following generative process for creating a document d in a corpus D:

1. For each document d, a distribution over topics is sampled from a Dirichlet distribution, $\theta \sim Dir(a)$.
2. For each word w in a document, select a topic, z, according to the distribution, Multinomial($\theta$).
3. Finally, a word is chosen from a multinomial probability conditioned on the topic, $p(w|z,\beta)$ which is a matrix of word probabilities over topics which is to be estimated from the training data. It is notable that LDA allows for an arbitrary number of topic assignments to a document and thus better explains the underlying topic distributions in the given corpus.

The present techniques intend to find generative models, i.e., tie the role decompositions to usage, wherein the resulting models explain the observed usage. Namely, by comparison with traditional role mining techniques where one considers only if a user has the privilege to perform an action, the present techniques consider whether a user has performed an action before (i.e., in the past) and how frequently. This concept is also referred to as "past actions" of the user in the description below. If, for example, the user has performed an action rarely (e.g., just once), then the action is not considered to be important to the user's role. However, if it is an action that the user performs frequently (e.g., at least once a month), this action is considered herein to be more important to the user's set of roles. One goal of the present techniques is to ensure that users with similar past usage or attributes will be assigned similar roles. Similarity for past usage is defined as a distance measure over the percentage of the past actions that were the same, such as Kullback-Liebler Divergence. Similarity for a set of attributes measures the amount of overlap, or the number of attributes two or more users share in common, such as the Jaccard Similarity measure. For example, a distance measure can be used, such as the Jaccard distance or Lp norm, to measure the distance or similarity between two sets of attributes. When using ATM, an attribute defines a distribution over roles, allowing one to measure the distance between attributes in terms of their predicted roles, for example, using a distance measure such as the Lp norm or Kullback Leibler divergence.

In another embodiment, the role decompositions obtained using the present techniques will tie the role decompositions causally to users' attributes. This is a very natural way of performing and reasoning with role decompositions and leads to access control policies which are easy to administer. While such a decomposition is not always possible, for example when similar users are assigned vastly different roles, these are viewed as exceptions. Role mining with attribution also enables predictive modeling of roles and permissions, since similar users, e.g., users having the same attributes, have the same roles and permissions. Techniques are built to predict roles and permissions for new users based only on their attributes. Prior work has only considered the problem of extending partially known permissions. The term "user attributes," as used herein refers to a key-value pair mapping a finite set of keys, i.e., attribute names or types, to a value for the user. The key-value pairs will map from an attribute name, such as a string, to a value represented as a string, number, or other type, for example, work location, department, whether he/she is a manager, etc.

The first procedure being presented herein for role mining uses an adaptation of LDA. The procedure involves recasting the role mining problem into text analytics by considering permissions as words and users as the documents (containing the entitlements or the usage of the permissions). The LDA process finds a set of topics (roles) which explain this corpus of documents. It produces a probability distribution $\theta$ for user-to-role assignments and a probability distribution $\beta$ for role-to-permission assignments. These probability distributions are converted into discrete user-to-role and role-to-permissions assignments. Also provided herein is a variant of this procedure where the words in each document are weighted by the corresponding usage of the permissions, i.e., a more heavily used permission has a higher weight.

The translation of a role mining problem to topic discovery is fairly straightforward: the individual permissions assigned to users can be thought of as the words in documents. Each document corresponds to a single user, i.e., the set of permissions assigned to that user. The topics correspond to the roles to assign to users. Thus, using LDA, an optimal set of roles is sought which can explain the observed corpus of permission assignments given to all of the users.

Note that LDA takes as input the weight or frequency count of words in each of the documents. One way to obtain frequency count of a permission is by observation of how often the permission is actually used by the user, which is a very good indicator of the importance of the word (permission) to the document (user). According to an exemplary embodiment, logs are maintained as a record of the usage of the permissions by the user (usage logs). This usage log data is then used to weight each permission with the frequency with which each user uses the permission. For example, one may select past log date, such as six months, and weight each permission proportional to the number of times the permission was used by a given user in the six month period. In the absence of this information, a constant weight w for all permissions is used and performance is evaluated for different values of w. Intuitively, low values of w, say w=1, do not yield good results for several reasons: first, permissions which are assigned to few users are effectively ignored leading to poor coverage. Second, with small weights, the gap between a word being in a document and not being in a document is not significant. This has been evaluated with a number of values for w and, as intuition suggests, increasing w leads to better results but increasing beyond w=10 does not improve performance.

The procedures described herein are advantageous compared to conventional approaches in many ways: First, the present techniques result in role decompositions with any arbitrary number of roles for each user, and thus remove artificial constraints in prior approaches. In particular, it places no artificial constraints on the number of roles to be assigned to a specific user. By contrast, Multi-Assignment Clustering (MAC) assigns at most t roles per user, where t is much smaller than the total number of roles. Further, the present techniques are dramatically faster than all previously known methodologies, typically by about three orders of magnitude. Also, the quality of the decomposition as measured by stability (i.e., how much the decomposition changes based on small changes in input), coverage (i.e., how well does the decomposition match the given permissions) and generality (i.e., how well does the decomposition cover new users and permissions), is as good if not better than prior approaches. Additionally, given improved performance, the process can be iterated at a different level of granularity to improve quality of role decompositions with an increase in total number of roles. Conventional methodologies cannot be extended like this due to performance bottlenecks.

Author-topic models (ATM) which extend LDA by adding authors (attributes of users) who are assigned a multinomial distribution over topics, can be adapted to yield role mining with explicit attribution. As highlighted above, the core machine learning technique has to be extended with a discretization step, resulting in roles that are causally associated with a user's attributes. While others have considered the problem before, the present techniques are the first to allow either a conjunction or disjunction of attributes to imply a role. This is done using a standard kernel trick in machine learning. The ATM-based methodologies provided herein perform as well as the present LDA-based methodologies but do require additional roles. However, the present ATM-based methodologies result in roles which are causally tied to user attributes.

The Author-topic model (ATM) tries to simultaneously model the content of documents and the interests of authors. The ATM extends LDA by allowing the mixture weights for different topics to be determined by the authors of the document. See Rosen-Zvi 2004 and Rosen-Zvi 2008. In this model, an author is represented by a probability distribution over topics, and each topic is represented as a probability distribution over words. A multi-author document thus inherits the mixture of probability distributions associated with its authors.

Assume that there are T topics and W words created by A authors in a text collection. The multinomial distribution over topics for each author is parameterized by $\theta$ of size T×A, where $\theta_{ta}$ represents the probability of assigning topic t to a word generated by author a. The multinomial distributions of topics over words are parameterized by $\Phi$ of size W×T, where $\Phi_{wt}$ represents the probability of generating word w from topic t. By learning the parameters of the model, the set of topics (roles) in a corpus (UP) can be extracted, and which topics (roles) are generated by which authors (user attributions) can be identified.

The procedure provided herein for tying a user's role to his/her attributes is also advantageous compared to conventional approaches: the present techniques can extend a user's attribute set by applying conjunction and disjunction of the attributes which can induce a better set of roles for the user, making this approach more flexible and extensible. Validation on a number of data sets both public and proprietary reflecting a range of policies such as firewall policies and administrative entitlements confirms the benefits of the present approach. Further, associating a user's roles causally to attributes enables predictive modeling, i.e., predicting the entitlements to assign to a new user based on his/her attributes. Techniques are described for administrators to use the role mining methodologies provided herein to provision roles and permissions for a new user solely based on their attributes.

Role mining with attribution can be used for predictive modeling, namely, given a new user and the user's attributes, the presented techniques can be used to identify a probability distribution over the roles. In most cases, the probabilistic assignments produced by the generative machine learning models yield probabilistic assignments of roles where there is a sharp drop off in probability after a few roles. An administrator can use this as decision support in identifying the roles and hence permissions for a new user.

A generative modeling-based role mining methodology 100 to obtain role assignments is provided in FIG. 1. In step 102, given a set of users and a set of permissions, at least one machine learning technique is used to obtain a collection K of k roles, and probability distributions $\theta$ and $\beta$ for user-to-role assignments and role-to-permission assignments, respectively. As described above, suitable machine learning techniques include, but are not limited to, latent Dirichlet allocation (LDA) and/or the author-topic model (ATM).

Embodiments employing LDA-based and ATM-based analysis will be used in the following description as non-limiting examples. In the following description, the particular model used (LDA or ATM) will depend on, for a given situation, what user information is available. This information can include user attributes, permissions and/or past actions. By way of example only, when user attribute data is available, an ATM-based process is preferably employed. In all other cases, it is preferable to use an LDA-based approach. It is however possible, when user attribute data is available, to use an LDA-based approach and just omit the attribute data from the analysis, and such an approach is anticipated by the present teachings. Further, as will be described in detail below, once a model is built (as per steps 102-112, as described below), a set of roles can be predicted for a new user(s) (as per steps 114 and 116, as described below). It is preferable to use the same technique to build the model as to make the predictions for a new user or users. For example, if an LDA-based approach is used to build the model (see above), then an LDA-based process is preferably used to make role predictions for the new user(s). Similarly, if an ATM-based approach is used to build the model (see above), then an ATM-based process is preferably used to make role predictions for the new user(s). While preferred, this is however not a requirement according to the present techniques.

Using the translation process described above, and invoking for instance LDA, results in a collection K of k roles, and probability distributions $\theta$ and $\beta$ which map users into roles and roles into permissions, respectively. For a user u, the distribution for u, $\theta_u$ will be a probability distribution over the k roles, i.e., $\theta_u(r)$ is the probability that user u will be in role r. Similarly, $\beta_r$ for a role r will define a distribution over the individual permissions. For role mining, these probability distributions need to be discretized to obtain binary assignments of roles to users and permissions to roles.

Figure 2:
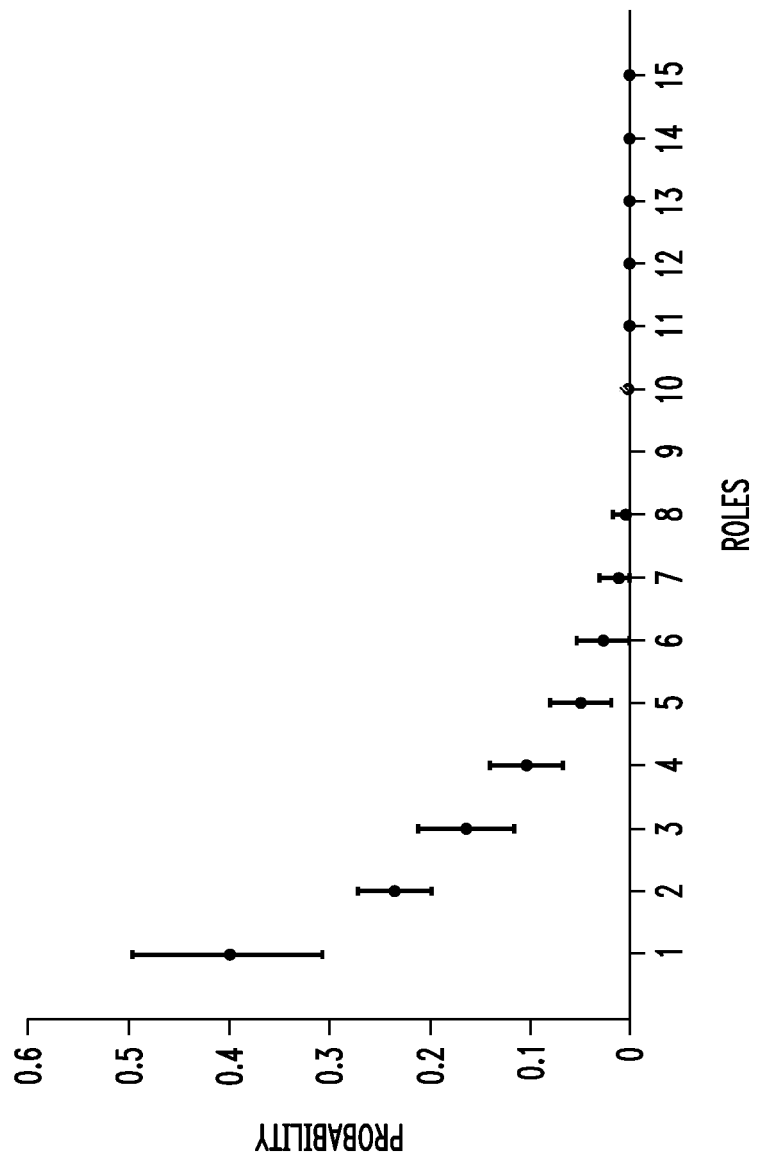
FIG. 2 is a graph illustrating a change of probabilities across roles ordered by their probabilities according to an embodiment of the present invention.

In all cases, the distributions observed show a sharp drop-off after a few values, i.e., if the probability distributions are ordered for a particular user or role in decreasing order, the curve looks like the example shown in FIG. 2. FIG. 2 is a graph illustrating a change of probabilities across roles ordered by their probabilities. This discretization methodology essentially goes through the probability vector finding an optimal point at which assigning roles to the user or permissions to the role can be stopped. Thus, the discretization is monotonic, i.e., if $\theta_u(r_1) \geq \theta_u(r_2)$, then user u will be assigned role $r_1$ whenever the user is assigned role $r_2$.

Detailed steps for discretization to obtain role and permission assignments is now described. Namely, in step 104, for each user i, a random number $0 \leq r \leq K$ is selected.

Next, Let $UR_0$ and $RP_0$ be the initial assignments where each user is assigned the top k'<k roles according to $\theta$ (step 106) and each role is assigned a random set of the top p'<p permissions according to $\beta$ (step 108). Let $w_0$ be the initial size of the mutation window. The outputs of methodology 100 are matrices UR and RP representing the binary role-to-user and permission-to-role assignments.

According to an exemplary embodiment, in step 106, for each user i, user i is assigned top r roles, i.e., those roles with the highest probability. In step 108, for each role j, a random number $0 \leq p \leq m$ is selected, wherein m is the total number of unique permissions and the role j is assigned the top p permissions With these initial assignments for UR and RP, in step 110, a distance measure between (i) the actual user permission assignment UP and (ii) a product of the current user-to-role UR and role-to-permission RP mappings ($UR_i*RP_j$,UP) is determined. In step 112, the user-to-role UR and role-to-permission RP mappings are updated to try to improve the fit of these matrices with the given permission data in UP. The goal in step 112 is to minimize the above-described distance measurement such that for each user i, holding all other users and roles constant, the top r roles are assigned to user i such that the distance measure is minimized; and for each role j, holding all other users and roles constant, the top p permissions are assigned to role j such that the distance measure is minimized.

According to an exemplary embodiment, step 112 is carried out first by adding the next highest probability role (or permission) and removing the lowest role or probability (permission) assigned. $UR_i$ (or $RP_j$) is then updated to $UR^i$ ($RP^i$). The distance ($UR^i*RP^i$,UP) is then compared with the distance ($UR_i*RP_j$,UP) and the change, if any, that yields the maximum reduction in the distance. In each iteration, keeping all other assignments the same, it is determined whether adding the role (permission) with the next highest probability or removing the lowest probability role (permission) assigned leads to a closer fit with the observed permission data. At the end of the iteration, the matrices $UR_i$ and $RP_j$ are simultaneously updated with the recorded (beneficial) changes which results in a better fit with the given permission data in UP.

Many distance measures were considered to evaluate the fit. The simplest measure is the Hamming distance between the actual user permission assignment UP, and the product of the current user-to-role and role-to-permission mappings. Another option considered is to have more weighting for over assignments, i.e., when assignments end up with a user having more permissions than specified in UP. The actual measure could be tailored to the particular use case. As shown in FIG. 1, steps 104-112 can be repeated until there are no further improvements produced and/or until a maximum number of iterations have occurred, i.e., a predetermined number of iterations has been reached.

As a further optimization, a random mutation step has been added to avoid local minima in a simulated annealing (SA)-like process. Each mutation consists of choosing a random $s_0$ (within a window s) for each user and role and adding (or subtracting) the next (previous) $s_0$ roles or permissions. Starting with a fixed window size, in each iteration, the size of the window is reduced. By way of example only, this random mutation step can involve for each user (and role) choosing $r < w_i$, and either adding the next r highest probability roles (permissions) or removing the r lowest probability roles (permissions) assigned. According to an exemplary embodiment $w_{i+1} = w_i/2$.

In practice, several parameters of the methodology may be altered for the sake of overall efficiency. By way of example only, for faster convergence, for each user u an upper limit $k_u$ can be identified beyond which it no longer makes sense to assign roles to u (or permissions to a role r). Also, in each step instead of linearly adding or removing a single role, the fact can be used that the distance 0 function will be convex with a minima at the optimal number of role (or permission) assignments and a binary search can be done.

Given the present techniques, when a new user(s) (e.g., a new hire) is introduced, the assignments for that new user(s) are easily made. Namely, once a final set of roles is established using methodology 100, a probability distribution for the new user can be identified based on that final set of roles. The method by which the probability distribution for the new user is identified is based on what information is available for the new user. As described above, this information can include attributes, permissions and/or past actions of the new user. As also described above, when user attribute data is available, then it is preferred to use an ATM-based approach, otherwise an LDA-based approach is preferred. Thus, if only permission and/or past action data is available for the new user, then the LDA-based analysis is used. On the other hand, if attribute data for the new user is available (either attribute data alone or in combination with permission and/or past action data), then an ATM-based analysis may be performed. As also described above, it is preferable to use the same technique (LDA-based analysis or ATM-based analysis) to build the model as to make role predictions for a new user or users. The various scenarios based on what user information is available are described, for example, in Molloy et al., "Mining Roles with Semantic Meanings," SACMAT 08, Jun. 11-13, 2008, pgs. 21-30, the contents of which are incorporated by reference herein, which describes the data mining problem in the context of the data requirements, for example, whether there is only user permission information available, or whether one also has user attribute information, and based on that what problems can be solved (see, for example, section 3. A ROADMAP FOR ROLE MINING).

For example, in the case where LDA is used, the permissions assigned to the new user or actions the user performed (past actions) are used in step 114. In the case where ATM-based analysis of user-attributes is involved, in step 114, the attributes for the new user are analyzed. If available, both the user attributes and permissions are analyzed in step 114. The details for providing this analysis are provided in Rosen-Zvi 2008. As described above, this analysis can include analyzing a relation between the user and the attributes to indicate which attributes are useful for role attribution. In step 116, the new user is assigned one or more roles based on the roles assigned to users with similar attributes. To assign new users to roles, a new role distribution from users to roles is required. This distribution is generated from the permissions assigned to the new users, past permission usage, and attributes (if known) for the user, and the learned model from prior users. Thus a new role distribution, θ, is needed given the role-to-permission distribution that was learned from other users, φ, during the model building stage (e.g., steps 102-112), and the new assignments or usage of the new user(s) X, and their attributes, A, such that we maximize the probability the observed data was generated from the generative model or learned role-permission and attribute-role distributions, i.e., arg max Pr[θ mid X, A, φ]. There are several ways of obtaining approximations for β, such as Gibbs sampling (see Rosen-Zvi 2008) or variational inference (see for example Blei for LDA).

An evaluation of methodology 100 and role decomposition is now provided. The LDA based process is evaluated using a number of data sets, some of which are public and others proprietary. The public data sets are from the HP Labs data set where two data sets are being considered: Firewall which is a firewall policy and APJ which is a Cisco firewall policy used to provide external users access to HP resources. See, for example, A. Ene et al., "Fast Exact and Heuristic Methods for Role Minimization Problems," 13th ACM Symposium on Access Control Models and Technologies (SACMAT 2008) pgs. 1-10, Jun. 11-13 (2008), the contents of which are incorporated by reference herein. Three proprietary data sets are referred to herein: Customer{1,2,3} which represent administrative access to various resources. The proprietary data sets also contain attribute information for users.

Performance: The biggest advantage of the present techniques is the dramatic performance improvements compared to prior methodologies. See FIGS. 3 and 4. FIGS. 3 and 4 are tables illustrating a performance comparison with MAC constraining users to 0, 1, or 2 roles. Namely, the table in FIG. 3 compares running times with MAC over a range of data sets with hours abbreviated 'h' and seconds abbreviated 's'. As shown in FIG. 3, the performance of LDA is a thousand fold better than MAC on these data sets. The total number of roles was restricted to 25 and 15 since increasing this value will cause MAC to run unreasonably long. FIG. 4 shows the coverage data for the two methodologies which are comparable and is investigated in depth below. The key reason for the performance improvements is that MAC enumerates all possible assignments of up to t roles and then optimizes the assignment of permissions while LDA simultaneously fixes both assignments. Due to slow performance, MAC can assign at most a small number of roles to each user.

Figure 5A:
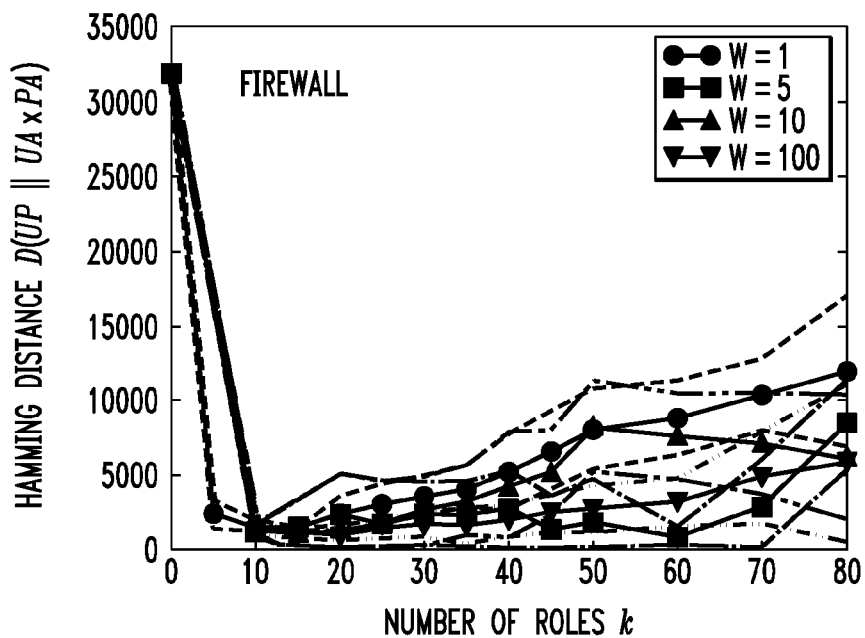
FIG. 5a is a graph illustrating Hamming Distance between input data and role-based access control (RBAC) state for the Firewall dataset according to an embodiment of the present invention.
Figure 5B:
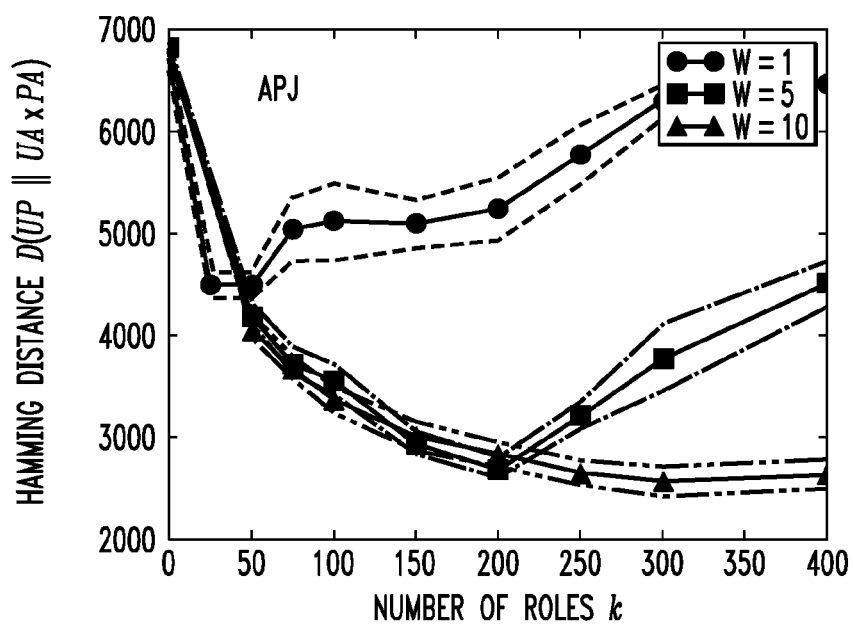
FIG. 5b is a graph illustrating Hamming Distance between input data and RBAC state for the APJ dataset according to an embodiment of the present invention.
Figures 5C, 6:
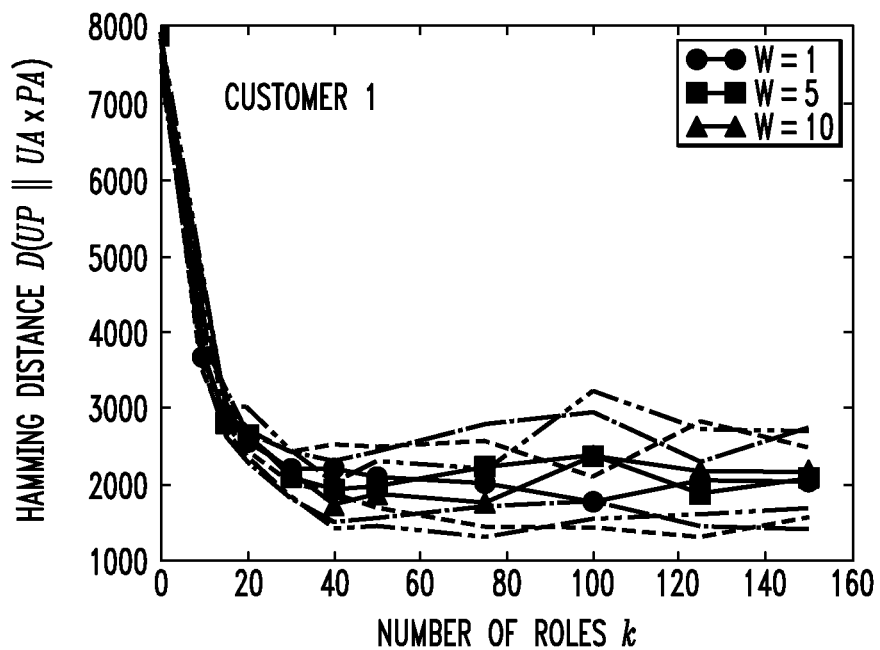
FIG. 5c is a graph illustrating Hamming Distance between input data and RBAC state for the Customer 1 dataset according to an embodiment of the present invention.
FIG. 6 is a diagram illustrating the results of iteratively running the present LDA miner resulting in the same number of roles on the Customer 1 dataset according to an embodiment of the present invention.

Coverage: A set of candidate roles can also be measured by how well the roles cover, or describe, the set of permissions assigned to the users. The Hamming distance was used to measure the fitness of the roles, and the results were plotted for three data sets, Firewall, APJ, and Customer 1. See FIGS. 5a-c, respectively. In each of FIGS. 5a-c, the number of roles k is plotted on the x-axis and the Hamming Distance is plotted on the y-axis. W is the common weight. It was found that, in all three cases, the LDA-based role mining approach quickly generates a small number of roles that are capable of reducing the distance between the input data and the role-based access control (RBAC) reconstruction, which then levels off. This behavior has been observed in many role mining methodologies and is a result of the distribution of entitlements in the data set. See Molloy.

With the exception of firewall, which converges near zero, these data sets are all long tailed, which is attributed to the leveling off of the distance measure: allowing this model to fit more roles does not necessitate more exact models. However, this is not viewed as a negative. Not all entitlements should be attributed to a user via roles. Many access control policies have errors, permissions incorrectly assigned to users, exceptions, permissions assigned to users for temporary or exceptional access, and may contain delegated authorizations. Molloy defines such assignments as noise that is not applicable to RBAC and should be discarded by a role mining methodology. Manual inspection by domain experts can be performed for the roles generated by the automated techniques to determine if the omitted, under assigned entitlements should be provisioned via roles. There are some instances where an administrator may wish to force the creation of more roles and cover a larger fraction of the user-permission relation. Due to the efficiency of the present LDA-based methodology as compared to prior boolean approaches (which are often exponential in running time) the present process can be iterated on the remaining uncovered permissions. As shown in the tables in FIGS. 6 and 7 the present LDA role mining technique was iteratively performed on the Customer 1 data set using a small number of roles for each iteration. The examples shown in FIGS. 6 and 7 perform role mining with the same goals, "produce 150 roles," but the example shown in FIG. 6 does this in increments of 25 roles, while the example shown in FIG. 7 is in increments of 15. That is, we generate a set of roles, fix them, and then generate the next batch assuming those are fixed. This resulted in a fast mining process, around 1 to 3 minutes per iteration, and resulted in increasingly finer grained roles. The impact of iteratively mining to 150 total roles was investigated. It is notable that a weighted Hamming Distance can be used to hinder the increase in the number of over-assigned permissions.

Figure 8A:
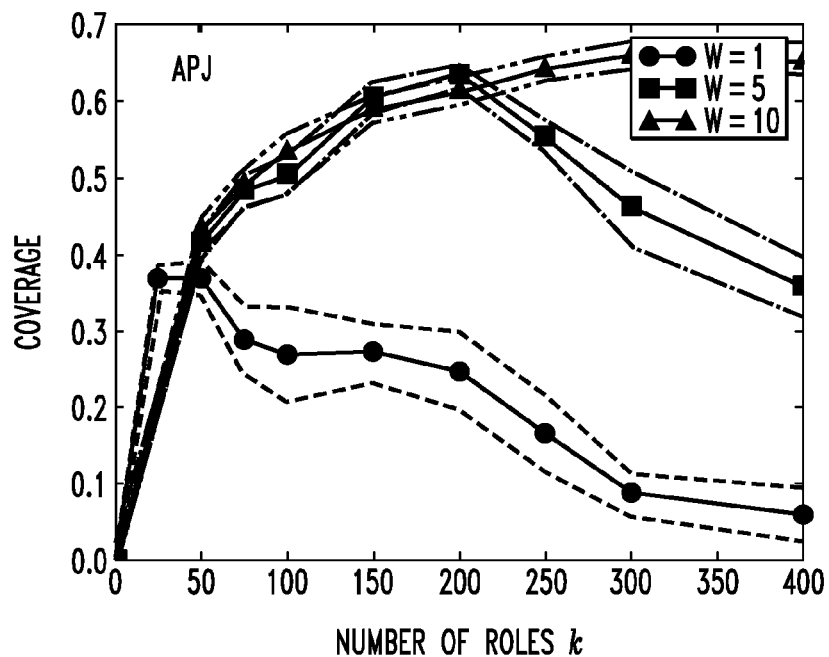
FIG. 8a is a graph illustrating the impact of the permission weight on role coverage for the APJ data set according to an embodiment of the present invention.
Figure 8B:
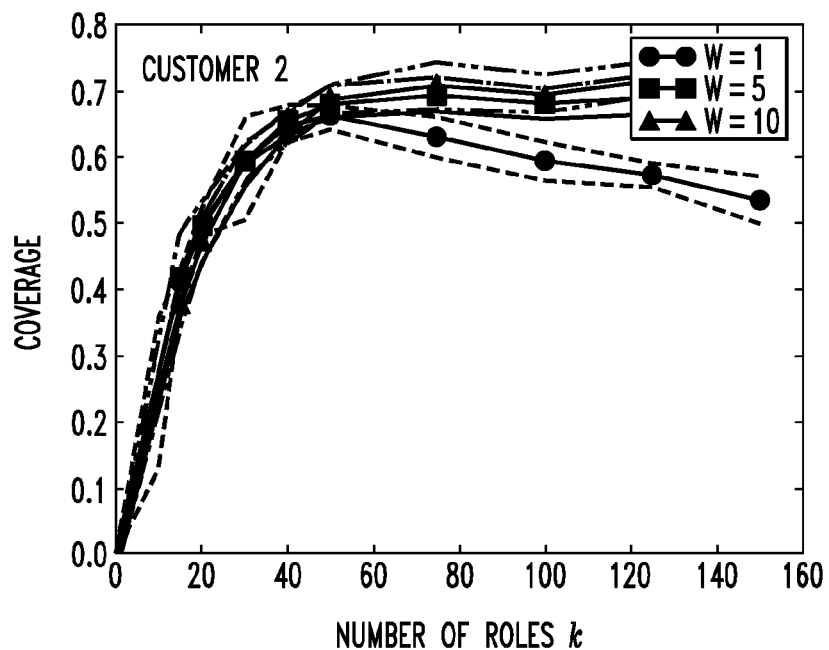
FIG. 8b is a graph illustrating the impact of the permission weight on role coverage for the Customer 2 data set according to an embodiment of the present invention.
Figure 8C:
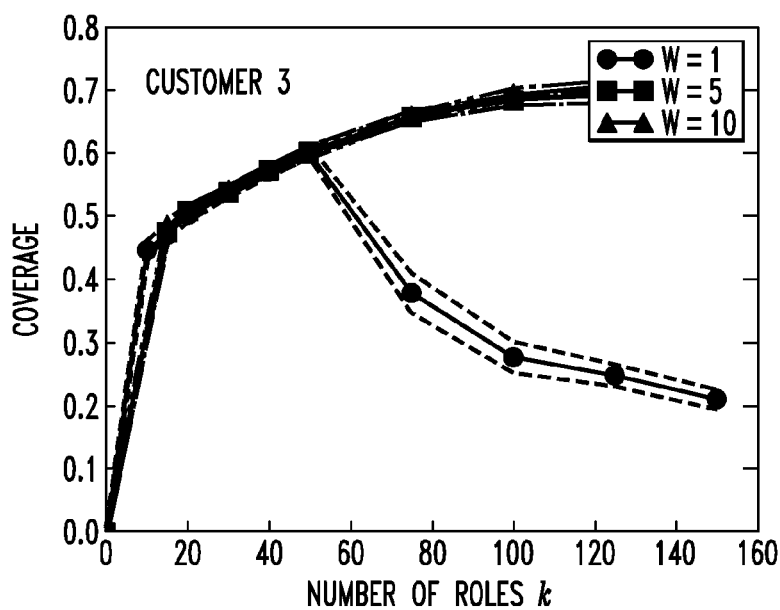
FIG. 8c is a graph illustrating the impact of the permission weight on role coverage for the Customer 3 data set according to an embodiment of the present invention.

As above, LDA requires the assignment of frequency counts or weights to the individual permissions. Without having access to actual usage data, the best strategy is to assign all the permissions to have the same weight. FIGS. 8a-c are graphs that describe the impact of varying the common weight w for all permissions for several data sets. In each of FIGS. 8a-c, number of roles k is plotted on the x-axis and coverage is plotted on the y-axis. From these data sets the conclusion is that low values of w yield poor results while increasing w too high has no impact. Generally, low values of w yield under-assigned decompositions (the number of over-assigned permissions is more stable).

Stability: Stability is measured as the amount of dissimilarity in a set of roles mined from different users from the same population. The intuition is that roles should not overfit the user population, and should be general enough to be applied to new users that will perform the same or similar tasks. To calculate role stability, firstly 10% of the users should be held out and the role mining methodology applied, producing a set of roles defined by the RP relation. Using the Jaccard distance measure between roles, the distance between two sets of roles can be calculated as the average Jaccard distance of the pairwise matching between the two sets. This is the distance metric from (Molloy) and is an instance of the minimum bipartite matching problem solvable by the Hungarian methodology. See, for example, H. W. Kuhn, "The Hungarian Method for the Assignment Problem," Naval Research Logistics Quarterly, 2(83-97) (1995) (hereinafter Kuhn).

Figure 9:
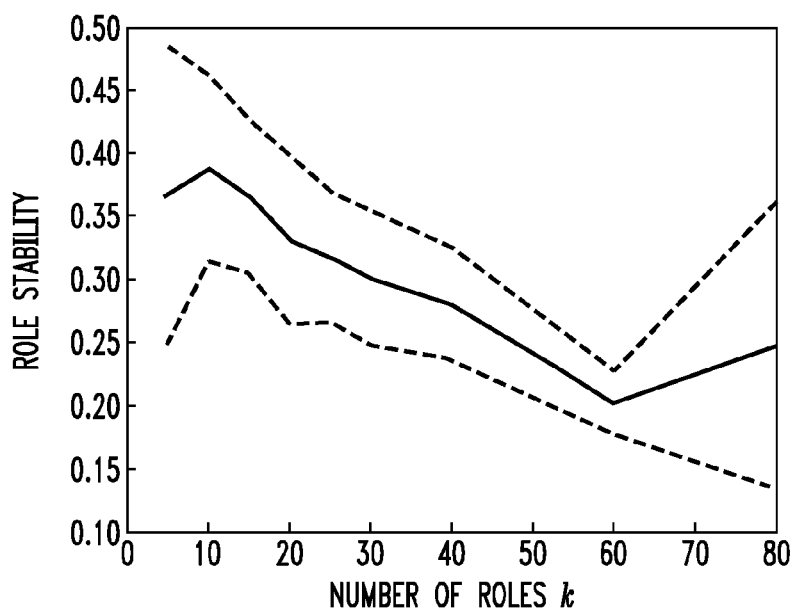
FIG. 9 is a graph illustrating stability of the latent Dirichlet allocation (LDA)-based roles on the Firewall dataset according to an embodiment of the present invention.

The stability of the roles for the Firewall data set over a range of number of roles k is plotted in the graph shown in FIG. 9. In FIG. 9, number of roles k is plotted on the x-axis and role stability is plotted on the y-axis. For each value of k five role sets are generated, and the average minimum distance for all pairs, i.e., there are 20 data points for each value k are calculated.

Generality: First, 10% of the users are held out and the LDA miner is applied on the remaining 90% of the users. An evaluation is then made on how well the mined roles can describe and cover the permissions of the held out users. Using the learned LDA model, inference can be performed on the permissions assigned to the held out users and a distribution of roles assigned to users obtained. Three different techniques can be tried: 1) applying any role such that its permissions are a subset of the user's permissions; 2) using the inference from the learned model, apply the iterative fitting method to the held out users; or 3) using the inference from the learned model, identify the largest drop in role-assignment probability, and assign all roles up-to that drop. Results from the Firewall and Customer 1 data sets are shown in the table in FIG. 10.

Explicit Attribution with Author Topic Model: For role mining with explicit attribution, the Author-Topic model is used which extends the models of LDA. It is assumed that, besides the user-permission data, a list of attribute values for each user is also given. The goal is to find a role decomposition which is correlated with the attributes of the user. The translation of this problem to ATM is again straightforward: As before, the words are the individual permissions, the documents are the users (permissions assigned to the users). In addition, the authors are the attributes of the individual users.

ATM can thus be used to obtain a distribution from authors to topics, i.e., from the user attributes to the assigned roles, in addition to the distribution β from topics to words. This yields a role decomposition which has explicit attribution. As before, these distributions will need to be discretized to explicit role assignments for each user. For a given user, the probability distribution corresponding to each of the attributes of this user is averaged. This yields a probability distribution over assigned roles which can be discretized as described above.

Preprocessing: Very crucial to the performance of ATM is the choice of relevant user attributes to use in the model, as well as cleansing the values of these attributes. First, attribute values need to be inspected so as to rationalize different values which are semantically the same (e.g., country=USA and country=US). Further, using all user attributes results in poor performance often with a vast amount of over-assignments. A simple measure to identify relevant attributes is to discard any attribute value which is not assigned to more than a threshold number of users.

Allowing arbitrary attributes: In contrast to prior approaches, any arbitrary number of attributes to imply a role is allowed. In particular, using the kernel-trick from machine learning, attributes which are boolean functions of the original attributes are precomputed and these used as the authors in ATM. In this implementation, a few optimizations are used: Typically in the provisioning of entitlements one never uses the negation of an attribute to provision roles. Thus the only boolean functions needing consideration are only conjunctions as disjunctions arise naturally from the definition of the ATM. As a further optimization, only conjunctions with at most three conjuncts can be considered since it is believed that for larger conjuncts it is more natural to define a new attribute reflecting these larger conjunctions. This is not a limitation but simply a design choice. The methodology presented is the first to allow for both disjunctions and conjunctions of attributes to imply permissions and roles.

Figures 10, 11A:
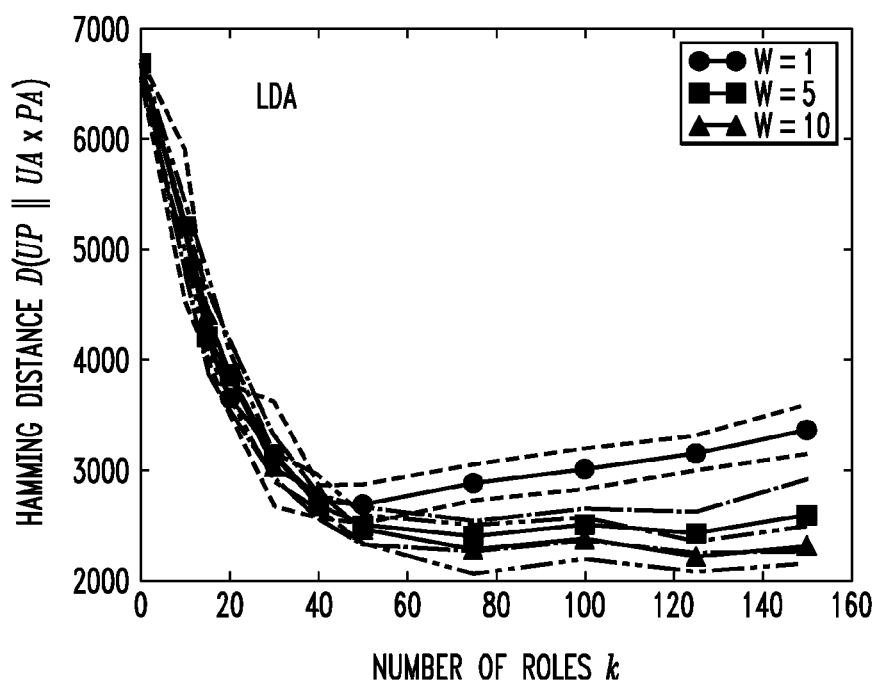
FIG. 10 is a table generality of assignments to new users, averaged over 10 runs according to an embodiment of the present invention.
FIG. 11a is a graph illustrating LDA role mining using the Customer 2 data set according to an embodiment of the present invention.
Figure 11B:
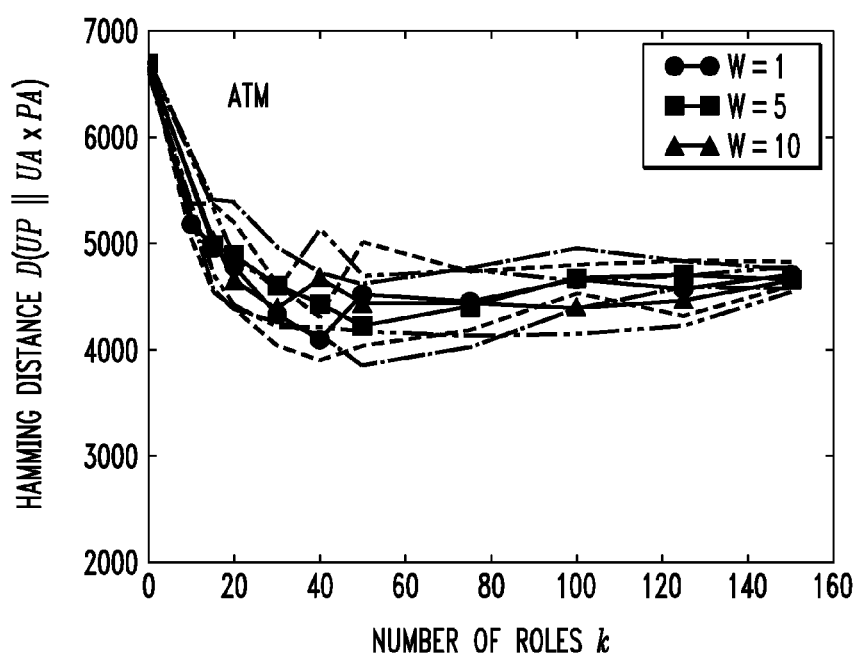
FIG. 11b is a graph illustrating author topic model (ATM) role mining using the Customer 2 data set according to an embodiment of the present invention.

Evaluation of ATM based mining: In the data sets where the ATM-based methodology was evaluated, performance is close to that of the LDA-based methodology. The ATM-based methodology requires an additional number of roles to achieve the same level of performance. FIGS. 11a and 11b compare the two methodologies on the same data set (i.e., Customer 2). In both FIGS. 11a and 11b, number of roles is plotted on the x-axis and Hamming Distance is plotted on the y-axis Predictive Modeling of Entitlements: This section outlines how the ATM-based methodology predicts roles for new users based only on their attributes. ATM produces a multinomial of attributes (authors) over the given set of roles (topics). Therefore, the multinomial distribution of a new user over the roles can be estimated by averaging the distributions of all attributes the user has over the topics. More formally, let u be a new user with attributes $A=(a_1 \ldots a_m)$, and θ be the multinomial distribution over topics for each attribute obtained from a training collection. Then, the probability of user u being assigned a role $r, \theta_{u,r}$, is determined as $$\frac{\sum_{i=0}^{m} \theta_{a_i,r}}{m}.$$

In practice, new users can have attributes not seen before, which can be effectively ignored. After obtaining all probabilities of a user over all K roles, the values are normalized so that $\Sigma_{k=1} K\theta_{u,r_k}=1$. In a real application, a security administrator can review and assign the roles with high probabilities to the new user.

Figure 12:
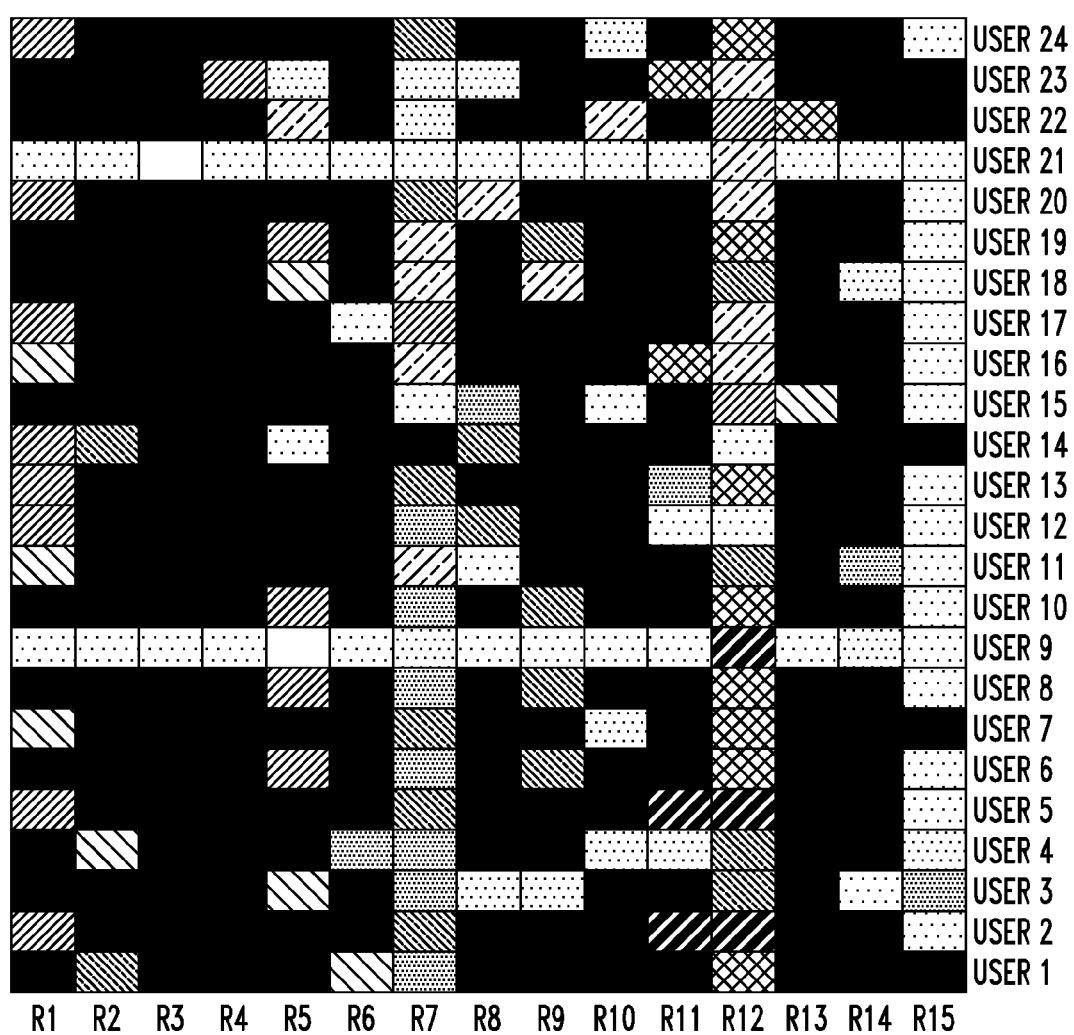
FIG. 12 is a diagram illustrating multinomial distribution over 15 roles for 24 new users according to an embodiment of the present invention.

FIG. 12 illustrates the concept. A private data set was used consisting of 224 users which was split into a training set comprising 90% of the users and a test data set with the remaining 24 users. The training data set contained 218 users, 1,090 user assignments and 1,736 distinct attributes in total. The training process produced 15 roles. The multinomial distributions of the users in the test set were then computed over the 15 topics. FIG. 12 displays the multinomial distributions of the 24 new users over the roles. In FIG. 12 the lighter shaded cells have higher probability values than the darker shaded cells. As the figure clearly shows, users have a biased distribution over roles owning a few prominent roles and many unimportant roles.

Further, the multinomial distributions were rank-ordered in decreasing order, and the average probability of the roles in each rank (i.e., from rank 1 to rank 15) were computed. FIG. 2, described above, depicts the mean probability and one standard deviation of each role rank. Observe that the mean probability decreases rapidly dropping close to zero quickly.

Figure 13:
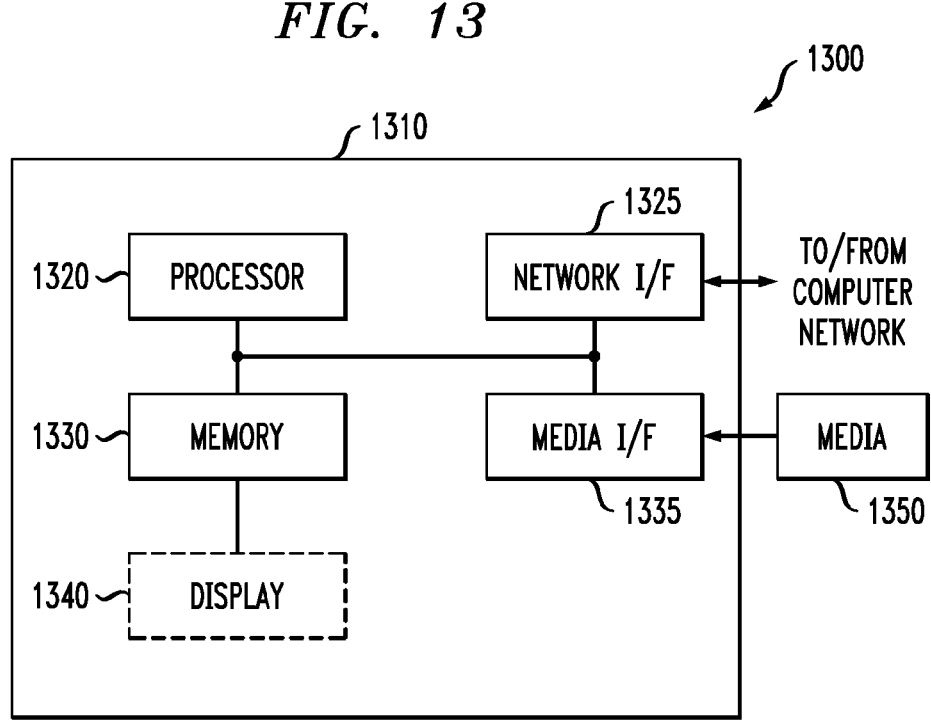
FIG. 13 is a diagram illustrating an exemplary apparatus for performing one or more of the methodologies presented herein according to an embodiment of the present invention.

Turning now to FIG. 13, a block diagram is shown of an apparatus 1300 for implementing one or more of the methodologies presented herein. By way of example only, apparatus 1300 can be configured to implement one or more of the steps of methodology 100 of FIG. 1 for obtaining role permission assignments.

Apparatus 1300 comprises a computer system 1310 and removable media 1350. Computer system 1310 comprises a processor device 1320, a network interface 1325, a memory 1330, a media interface 1335 and an optional display 1340. Network interface 1325 allows computer system 1310 to connect to a network, while media interface 1335 allows computer system 1310 to interact with media, such as a hard drive or removable media 1350.

As is known in the art, the methods and apparatus discussed herein may be distributed as an article of manufacture that itself comprises a machine-readable medium containing one or more programs which when executed implement embodiments of the present invention. For instance, when apparatus 1300 is configured to implement one or more of the steps of methodology 100 the machine-readable medium may contain a program configured to use at least one generative machine learning technique to obtain a collection K of k roles, a probability distribution θ for user-to-role assignments and a probability distribution β for role-to-permission assignments; and use the probability distribution θ for user-to-role assignments and the probability distribution β for role-to-permission assignments to produce a final set of roles, including user-to-role assignments and role-to-permission assignments.

The machine-readable medium may be a recordable medium (e.g., floppy disks, hard drive, optical disks such as removable media 1350, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 1320 can be configured to implement the methods, steps, and functions disclosed herein. The memory 1330 could be distributed or local and the processor device 1320 could be distributed or singular. The memory 1330 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1320. With this definition, information on a network, accessible through network interface 1325, is still within memory 1330 because the processor device 1320 can retrieve the information from the network. It should be noted that each distributed processor that makes up processor device 1320 generally contains its own addressable memory space. It should also be noted that some or all of computer system 1310 can be incorporated into an application-specific or general-use integrated circuit.

Optional video display 1340 is any type of video display suitable for interacting with a human user of apparatus 1300. Generally, video display 1340 is a computer monitor or other similar video display.

In conclusion, role mining methodologies have been defined based on the machine learning methodologies Latent Dirichlet Allocation (LDA) and Author-Topic Model (ATM), which produce generative role decompositions, i.e., explaining why a particular user gets an assigned role. These methodologies are significantly better than all prior methodologies and are the first efficient methodologies to solve the problem in full generality, i.e., impose no artificial constraints. The performance of the methodology is a thousand-fold better than prior approaches while producing coverage which is as good, if not better. Because of the substantial improvements in running time, coverage by iterating at a different level of granularity can be arbitrarily improved. The adaptation of ATM provides the first general role mining methodology with attribution which allows for both conjunction and disjunction of attributes to imply the user's roles and permissions. The attribution methodologies can be used for predictive modeling where decision support can be provided to an administrator to provision a new user's role and hence permissions.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for performing role mining given a plurality of users and a plurality of permissions, the method comprising the steps of:
    using at least one generative machine learning technique to obtain a collection K of k roles, a probability distribution θ for user-to-role assignments and a probability distribution β for role-to-permission assignments, wherein the probability distribution θ for user-to-role assignments and the probability distribution β for role-to-permission assignments account for past usage of permission assignments by the users; and
    finding latent roles in the permissions by converting the probability distribution θ for user-to-role assignments and the probability distribution β for role-to-permission assignments into a final set of roles, including discrete user-to-role assignments and role-to-permission assignments.

2. The method of claim 1, wherein the machine learning technique comprises at least one of latent Dirichlet allocation (LDA) and the author-topic model (ATM).

3. The method of claim 1, wherein usage logs are given which indicate a frequency with which the users use the permissions thus serving as an indicator of an importance of the permissions to the users.

4. The method of claim 3, further comprising the step of:
    using the usage logs to weight each of the permissions with the frequency with which the users use the permissions.

5. The method of claim 1, further comprising the step of:
    weighting each of the permissions with a constant weight w.

6. The method of claim 1, further comprising the steps of:
    using at least one generative machine learning technique to obtain a probability distribution θ for user-to-role assignments and a probability distribution β for role-to-permission assignments using a set of user attributes for each of the users.

7. The method of claim 6, further comprising the step of:
    assigning one or more of the roles to a new user based on i) an analysis of similarity between the new user and one or more other users and ii) the roles assigned to the one or more other users.

8. The method of claim 6, wherein the at least one generative machine learning technique comprises the author-topic model (ATM).

9. The method of claim 1, further comprising a step of:
    determining a distance measure between an actual user permission UP and a product of a current user-to-role UR and role-to-permission RP assignments.

10. The method of claim 9, wherein the step of determining the distance measure comprises steps of:
    (a) for each user i, selecting a random number $0 \leq r \leq K$;
    (b) for each user i, assigning user i top r roles;
    (c) for each role j, selecting a random number $0 \leq p \leq m$, where m is a total number of unique permissions and the role is assigned top p permissions;
    (d) determining the distance measure;
    (e) updating the user-to-role assignments and role-to-permission assignments to decrease the distance measure, such that for each user i, holding all other users and roles constant, the top r roles are assigned to user i such that the distance measure is minimized; and for each role j, holding all other users and roles constant, the top p permissions are assigned to role j such that the distance measure is minimized; and
    (f) repeating steps (a) to (e) until there are no further improvements and/or a maximum number of iterations have occurred.

11. A method for predictive modeling of roles and permissions given a plurality of users and a plurality of roles, the method comprising steps of:
    using at least one generative machine learning technique to obtain a collection K of k roles, a probability distribution θ for user-to-role assignments and a probability distribution β for role-to-permission assignments, wherein the probability distribution θ for user-to-role assignments and the probability distribution β for role-to-permission assignments account for past usage of permission assignments by the users;
    finding latent roles in the permissions by converting the probability distribution θ for user-to-role assignments and the probability distribution β for role-to-permission assignments into a final set of roles, including discrete user-to-role assignments and role-to-permission assignments;
    analyzing attributes of a new user; and
    identifying a probability distribution of roles for the new user based on the final set of roles.

12. The method of claim 11, wherein the machine learning technique comprises at least one of latent Dirichlet allocation (LDA) and the author-topic model (ATM).

13. An apparatus for performing role mining given a plurality of users and a plurality of permissions, the apparatus comprising:
 a memory; and
 at least one processor device, coupled to the memory, operative to:
  use at least one generative machine learning technique to obtain a collection K of k roles, a probability distribution θ for user-to-role assignments and a probability distribution β for role-to-permission assignments, wherein the probability distribution θ for user-to-role assignments and the probability distribution β for role-to-permission assignments account for past usage of permission assignments by the users; and
  find latent roles in the permissions by converting the probability distribution θ for user-to-role assignments and the probability distribution β for role-to-permission assignments into a final set of roles, including discrete user-to-role assignments and role-to-permission assignments.

14. The apparatus of claim 13, wherein the at least one processor device is further operative to:
 determine a distance measure between an actual user permission UP and a product of a current user-to-role UR and role-to-permission RP assignments.

15. The apparatus of claim 14, wherein the at least one processor device when performing the determine step is further operative to:
 (a) for each user i, select a random number $0 \leq r \leq K$;
 (b) for each user i, assign user i top r roles;
 (c) for each role j, select a random number $0 \leq p \leq m$, where m is a total number of unique permissions and the role is assigned top p permissions;
 (d) determine the distance measure;
 (e) update the user-to-role assignments and role-to-permission assignments to decrease the distance measure, such that for each user i, holding all other users and roles constant, the top r roles are assigned to user i such that the distance measure is minimized; and for each role j, holding all other users and roles constant, the top p permissions are assigned to role j such that the distance measure is minimized; and
 (f) repeat steps (a) to (e) until there are no further improvements and/or a maximum number of iterations have occurred.

16. An article of manufacture for performing role mining given a plurality of users and a plurality of permissions, comprising a machine-readable recordable medium containing one or more programs which when executed implement the steps of:
 using at least one generative machine learning technique to obtain a collection K of k roles, a probability distribution θ for user-to-role assignments and a probability distribution β for role-to-permission assignments, wherein the probability distribution θ for user-to-role assignments and the probability distribution β for role-to-permission assignments account for past usage of permission assignments by the users; and
 finding latent roles in the permissions by converting the probability distribution θ for user-to-role assignments and the probability distribution β for role-to-permission assignments into a final set of roles, including discrete user-to-role assignments and role-to-permission assignments.

17. The article of manufacture of claim 16, wherein the one or more programs which when executed further implement the step of:
 determining a distance measure between an actual user permission UP and a product of a current user-to-role UR and role-to-permission RP assignments.

18. The article of manufacture of claim 17, wherein the one or more programs which when executing the determining step further implement the steps of:
 (a) for each user i, selecting a random number $0 \leq r \leq K$;
 (b) for each user i, assigning user i top r roles;
 (c) for each role j, selecting a random number $0 \leq p \leq m$, where m is a total number of unique permissions and the role is assigned top p permissions;
 (d) determining the distance measure;
 (e) updating the user-to-role assignments and role-to-permission assignments to decrease the distance measure, such that for each user i, holding all other users and roles constant, the top r roles are assigned to user i such that the distance measure is minimized; and for each role j, holding all other users and roles constant, the top p permissions are assigned to role j such that the distance measure is minimized; and
 (f) repeating steps (a) to (e) until there are no further improvements and/or a maximum number of iterations have occurred.

19. An apparatus for predictive modeling of roles and permissions given a plurality of users and a plurality of roles, the apparatus comprising:
 a memory; and
 at least one processor device, coupled to the memory, operative to:
  use at least one generative machine learning technique to obtain a collection K of k roles, a probability distribution θ for user-to-role assignments and a probability distribution β for role-to-permission assignments, wherein the probability distribution θ for user-to-role assignments and the probability distribution β for role-to-permission assignments account for past usage of permission assignments by the users;
  find latent roles in the permissions by converting the probability distribution θ for user-to-role assignments and the probability distribution β for role-to-permission assignments into a final set of roles, including discrete user-to-role assignments and role-to-permission assignments;
  analyze attributes of a new user; and
  identify a probability distribution of roles for the new user based on the final set of roles.

20. The apparatus of claim 19, wherein the at least one processor device is further operative to:
 determine a distance measure between an actual user permission UP and a product of a current user-to-role UR and role-to-permission RP assignments.

21. The apparatus of claim 20, wherein the at least one processor device when performing the determine step is further operative to:
 (a) for each user i, select a random number $0 \leq r \leq K$;
 (b) for each user i, assign user i top r roles;
 (c) for each role j, select a random number $0 \leq p \leq m$, where m is a total number of unique permissions and the role is assigned top p permissions;
 (d) determine the distance measure;
 (e) update the user-to-role assignments and role-to-permission assignments to decrease the distance measure, such that for each user i, holding all other users and roles constant, the top r roles are assigned to user i such that the distance measure is minimized; and for each role j, holding all other users and roles constant, the top p permissions are assigned to role j such that the distance measure is minimized; and (f) repeat steps (a) to (e) until there are no further improvements and/or a maximum number of iterations have occurred.

* * * * *